United States Patent [19]
Adams et al.

[11] Patent Number: 5,851,047
[45] Date of Patent: Dec. 22, 1998

[54] FIFTH WHEEL ADAPTABLE TONNEAU COVER FOR PICKUP

[76] Inventors: Robert M. Adams; Shirley R. Adams, both of 14264 S. Banff La., Arizona City, Ariz. 85223

[21] Appl. No.: 832,420

[22] Filed: Apr. 2, 1997

[51] Int. Cl.⁶ .................................................. B60P 7/04
[52] U.S. Cl. .................................. 296/100.18; 280/423.1
[58] Field of Search ........................ 296/100, 219; 280/423.1; 105/377.01, 377.07, 377.09

[56] References Cited

U.S. PATENT DOCUMENTS

| | | | |
|---|---|---|---|
| 3,174,794 | 3/1965 | Moynihan, Jr. | 296/145 X |
| 3,574,363 | 4/1971 | Stephenson . | |
| 3,707,919 | 1/1973 | Adler | 296/219 X |
| 3,936,077 | 2/1976 | Bliek | 280/423 |
| 4,218,087 | 8/1980 | Neville | 296/100.18 |
| 4,272,119 | 6/1981 | Adams | 296/100 |
| 4,542,911 | 9/1985 | Mulligan | 280/423 |
| 4,832,359 | 5/1989 | Rafi-Zadeh | 296/100 X |
| 4,971,130 | 11/1990 | Bentley | 160/368.1 |
| 5,056,856 | 10/1991 | Pederson | 296/100 |
| 5,125,221 | 6/1992 | Looney | 296/100 X |
| 5,165,750 | 11/1992 | Pirhonen | 296/100 |
| 5,303,947 | 4/1994 | Gerber | 280/423.1 |

*Primary Examiner*—Dennis H. Pedder
*Attorney, Agent, or Firm*—Meschkow & Gresham, P.L.C.; Lowell W. Gresham; Jordam M. Meschkow

[57] ABSTRACT

An adaptable tonneau cover (28) for attaching to a pickup truck bed (22) that is equipped with a fifth wheel trailer hitch (26). The tonneau cover (28) is made of flexible sheet material (44) and is dimensioned to cover the pickup truck bed (22). An opening (50) in the sheet material (44) is positioned over fifth wheel trailer hitch (52) to allow coupling of fifth wheel trailer tongue (26) to fifth wheel trailer hitch (52). A flap (66) is attached to the sheet material (44) to cover the opening (50) when the fifth wheel trailer (24) is not attached.

8 Claims, 6 Drawing Sheets

FIFTH WHEEL ADAPTABLE TONNEAU COVER FOR PICKUP

TECHNICAL FIELD OF THE INVENTION

The present invention relates generally to the field of covering attachments for pickup truck beds. More specifically, the present invention pertains to a tonneau covering for a pickup truck bed having a fifth wheel trailer hitch.

BACKGROUND OF THE INVENTION

The advantages of a covered pickup truck bed are well known and highly desirable. A covered truck bed keeps cargo dry and out of sight, protecting the cargo from theft as well as the elements. When a pickup truck travels down a highway with an uncovered truck bed and a raised tailgate, wind striking the tailgate produces aerodynamic drag (tailgate drag) on the truck and this tailgate drag significantly reduces fuel economy. By completely covering the top of the truck bed, tailgate drag is eliminated and a significant increase in fuel economy can result.

Simple conventional pickup truck bed coverings do not work when a pickup truck is set up to tow a fifth wheel trailer. For a fifth wheel trailer arrangement, a trailer hitch receiver is mounted in the truck bed that the covering needs to cover. This leads to many different modes of use for the pickup truck bed. For example, the trailer may or may not be attached. Moreover, whether or not the trailer is attached, the truck bed may be hauling small items which permit the covering to be installed or large items which do not permit the covering to be installed. Simple conventional pickup truck bed coverings do not accommodate the mode where a fifth wheel trailer is attached, and many are not well-suited to switching back and forth between operation with the covering installed and operation with the covering not installed.

A few pickup truck coverings have been devised to accommodate fifth wheel trailers. However, the conventional fifth wheel-adaptable coverings do not adequately adapt to the various modes in which a truck bed may be used. For example, the use of a rigid material as a covering is undesirable because it does not lend itself to switching back and forth between operation with the covering installed and operation with the covering not installed. When the covering is not installed, it must be stowed. Unfortunately rigid coverings tend to be bulky and to require an excessive amount of space when not in use. When the covering is not installed, it often cannot be stowed elsewhere in the pickup truck because it takes up too much space. Moreover, the rigid material coverings tend to be extremely difficult to install and remove due to their bulk and weight.

Some conventional fifth wheel trailer-adaptable coverings do not accommodate ease of trailer attachment and detachment. For example, some coverings must be largely disassembled in order to hitch or remove a fifth wheel trailer from the pickup truck.

Likewise, most conventional fifth wheel trailer-adaptable coverings do not accommodate ease of access to the truck bed. In such coverings, small and inadequate access panels may be provided, or the coverings must be largely removed or disassembled in order to achieve good access to the truck bed. Cover removal is often a difficult task in many conventional designs.

Moreover, in order to accommodate a fifth wheel trailer, an opening large enough to allow a connection to the trailer neck and yet prevent interference between the covering and trailer neck is provided in the center of the covering. Unfortunately, the opening causes a gap to form between trailer neck and the covering. This gap allows water, wind, dirt, snow, and other debris to enter the truck bed when a trailer is being towed.

Further, when a trailer is not attached, a detachable panel is often installed over the opening. This detachable panel approach is particularly undesirable. The detachable panel is often a rigid panel that must be removed and stowed when a trailer is being towed. When the panel is rigid, it requires an undesirable large amount of space for its stowage. Whether or not it is rigid, the detachable nature of the panel causes it to become easily lost or misplaced.

When such a covering is installed, whether or not a trailer is being towed, this and other openings and access panels and other features which may be provided to accommodate a trailer and the hitching and removal process weaken the covering's ability to shed water. In one conventional design, such an opening is surrounded by a raised lip. The raised lip may aid the shedding of water, but provides a obstruction to the air flow which increases wind noise and decreases fuel economy.

In other attempts at devising pickup truck bed coverings, cumbersome sleeves have been provided to seal the above-discussed gap within the opening between the covering and the fifth wheel trailer neck. Such sleeves tend to be excessively difficult to attach and remove once a trailer is installed. In one conventional fifth wheel trailer-adaptable covering, a complex structure is provided to lower the height of the covering to beneath the trailer hitch within the truck bed in the vicinity of the trailer hitch and along a track between the trailer hitch and the rear of the pickup truck bed. While no cumbersome sleeves or detachable panels are required, this approach is undesirable because it leads to an expensive and complex solution which diminishes the truck bed's ability to accommodate cargo while the covering is installed, and it allows the trailer hitch itself to remain exposed to the elements. Shielding a trailer hitch from the elements is desirable since exposure to the elements increases hitch maintenance and the possibility of hitch malfunction.

SUMMARY OF THE INVENTION

Accordingly it is an advantage of the present invention to provide an improved fifth wheel adaptable tonneau cover for a pickup truck equipped with a fifth wheel trailer hitch.

Another advantage of the present invention is to provide a lightweight truck bed cover that accommodates a fifth wheel trailer hitch and yet is foldable and storable in a small space and as one piece.

Another advantage of the present invention is to provide a tonneau cover that accommodates a fifth wheel trailer hitch and is easily installed and removed.

Another advantage of the present invention is to provide a tonneau cover that accommodates a fifth wheel trailer hitch and allows easy access to all portions of the truck bed when the tonneau cover is installed.

Another advantage of the present invention is to provide a tonneau cover that accommodates a fifth wheel trailer hitch and provides substantially weathertight protection for the truck bed and trailer hitch when a trailer is attached.

Another advantage of the present invention is to provide a tonneau cover that accommodates a fifth wheel trailer hitch and promotes ease of trailer hitching and removal.

Another advantage of the present invention is to provide a tonneau cover that accommodates a fifth wheel trailer hitch and is adaptable to a variety of truck bed tailgates.

The above and other advantages of the present invention are carried out in one form by an adaptable tonneau cover for attaching to a pickup truck bed. The pickup truck bed is equipped with a fifth wheel trailer hitch. The tonneau cover is made of flexible sheet material and is dimensioned to cover the pickup truck bed. An opening in the sheet material is positioned over the trailer hitch to allow coupling of the hitch and a trailer. A flap is attached to the sheet material to cover this opening when the trailer is not attached.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Preferred embodiments of the present invention are herein described in the context of a pickup truck having a truck bed equipped with a fifth wheel trailer hitch and fifth wheel trailer. However, the present invention can be applied to other types of trucks having a truck beds equipped with any of a variety of trailer hitches. Herein, a pickup truck may be referred to simply as a truck, a pickup truck bed may be referred to simply as a truck bed, a fifth wheel trailer hitch may be referred to simply as a trailer hitch or hitch, and a fifth wheel trailer may be referred to simply as a trailer.

Figure 1:
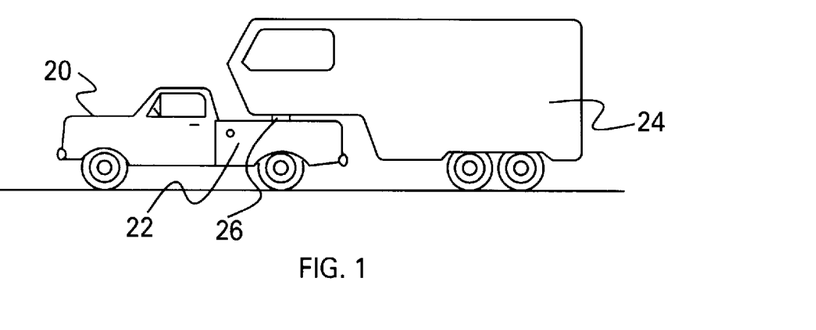
FIG. 1 shows a side view of a pickup truck with a fifth wheel trailer attached.

FIG. 1 shows a side view of pickup truck 20 having a truck bed 22. Truck 20 is shown towing a fifth wheel trailer 24 having a trailer tongue or gooseneck 26. A pickup truck being so configured is herein referred to as having a fifth wheel trailer attached or in tow.

Figure 2:
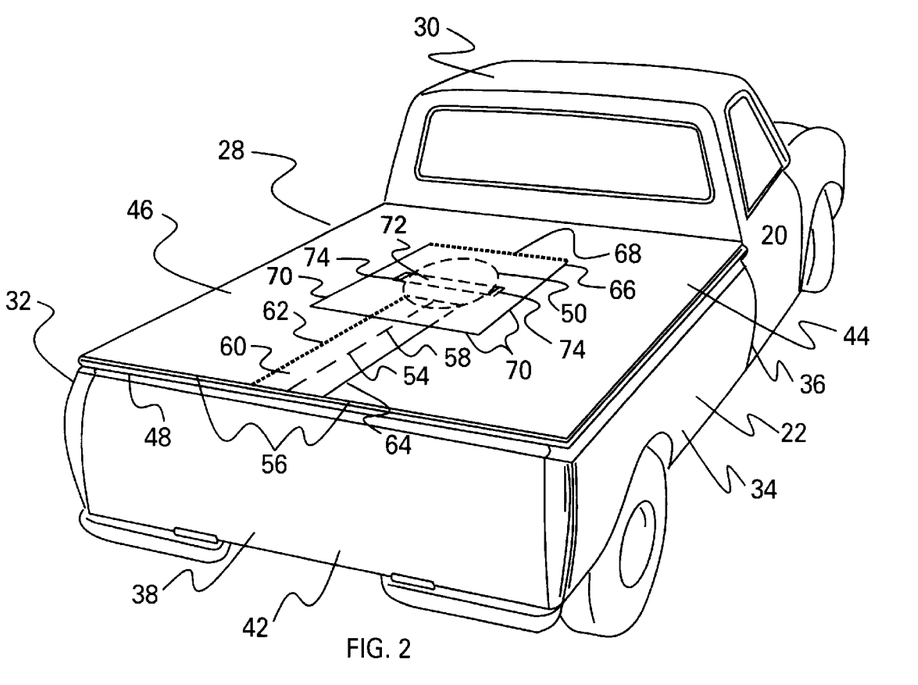
FIG. 2 shows a perspective view of a preferred embodiment of a fifth wheel adaptable tonneau cover installed on a pickup truck bed.
Figure 4:
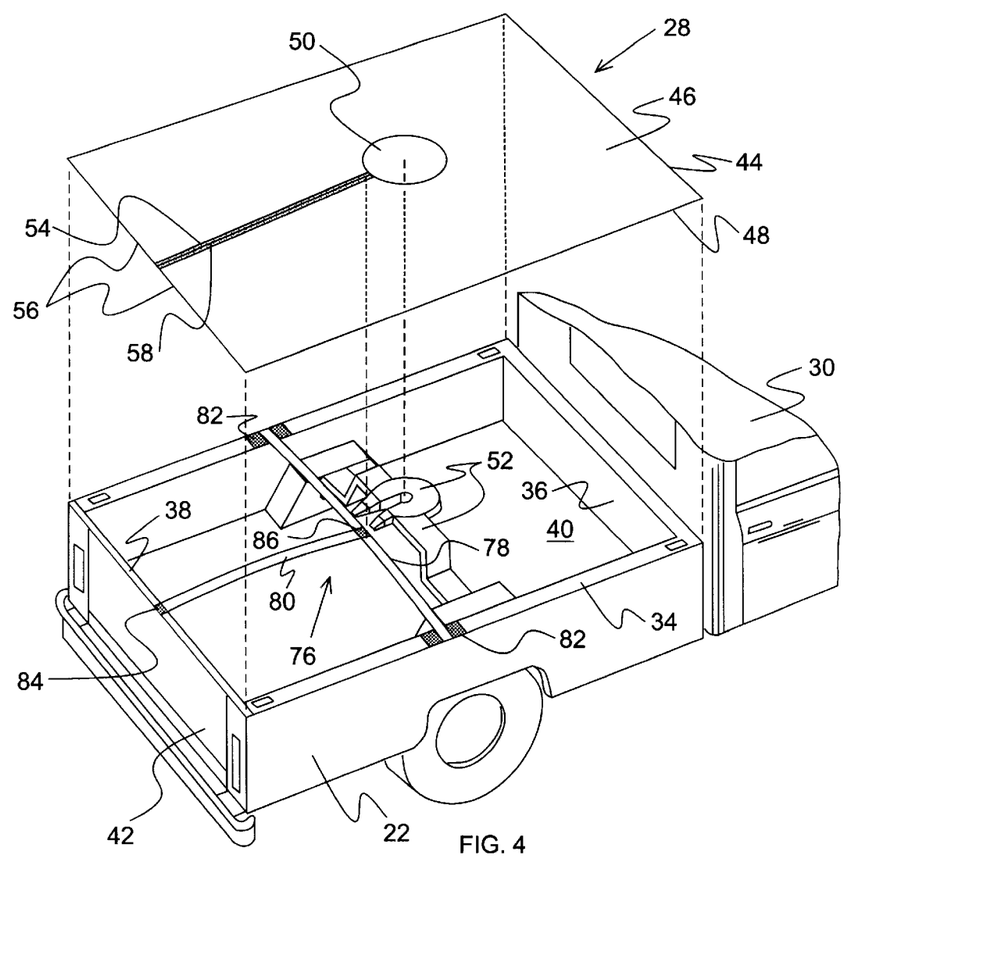
FIG. 4 shows a perspective view of a preferred embodiment of a fifth wheel adaptable tonneau cover and installation assembly.

FIG. 2 shows a perspective view of a preferred embodiment of a tonneau cover 28 on top of pickup truck bed 22. In addition to truck bed 22, pickup truck 20 includes a truck cab 30. Truck bed 22 is of a rectangular shape having a left side 32, a right side 34, a front end 36 and a back end 38. Truck bed left side 32, right side 34 and front end 36 are attached to and extend vertically from a truck bed floor 40, which is illustrated in FIG. 4. Truck bed back end 38 is desirably a fold-down tailgate 42 that is shown in an upright position.

Tonneau cover 28 is dimensioned to cover truck bed 22 and includes a flexible sheet material 44. Sheet material 44 has a top side 46 and a bottom side 48 and is desirably formed from a suitable backed vinyl, canvas, or other material conventionally used in the construction of tonneau covers, convertible tops and the like.

An opening 50 is cut in sheet material 44 such that opening 50 is positioned over a hitch receiver 52 (FIG. 4) when tonneau cover 28 is installed on truck bed 22. Opening 22 has a shape that roughly follows a top surface outline of hitch receiver 52.

A cut 54 extends from opening 50 to a rear edge 56 of sheet material 44. Cut 54 is parallel to truck bed left side 32 and right side 34. Sheet material rear edge 56 abuts a top edge of tail gate 42 when tail gate 42 is in its closed or upright position. Cut 54 separates sheet material 44 into two sections that are joined by a releasable fastener 58. Cut 54 and fastener 58 are fully covered by a rectangular flap 60. Flap 60 is unreleasably attached to sheet material top side 46 by a seam 62 at one side of cut 54 and releasably attached by a fastener 64 on the opposite side of cut 54.

A releasable fastener or attachment, such as fasteners 58 and 64, refers to those types of attachments or fasteners that are designed to mate together members so that these members can be pulled apart (separated) and mated (attached) together numerous times. An unreleasable fastener or attachment, such as seam 62, refers to those types of attachments or fasteners that are designed to mate together members so that once attachment or fastening has occurred these members cannot be pulled apart (separated) under normal use.

FIG. 2 also shows a rectangular shaped flap 66 in a closed position. In this closed position, flap 66 covers opening 50. A side of flap 66 that is parallel and closest to truck bed front end 36 is unreleasably attached to sheet material top side 46 by seam 68. In the preferred embodiment, flap 66 has three remaining sides that are releasably attached to sheet material top side 46 by a fastener 70. A strap 72 extends across opening 50 from one side to another and is attached to sheet material bottom side 48 by a fastener 74. In one embodiment, seam 68 is sewn to tonneau cover sheet material 44 and forms a substantially weathertight seal along that side of flap 66. The remaining three sides of flap 66 are attached to sheet material top side 36 by a "hook and loop" implementation of fastener 70 in the preferred embodiments.

A hook and loop type fastener is used to mate or join two separate members together. Well known to those skilled in the art of fasteners, a hook and loop type fastener consists of a hook member that has an abundance of fabric hooks attached to a strip of material and a loop member that has an abundance of fabric loops attached to a separate strip of material. The hook strip of material is attached to one of the two members to be joined and the loop strip of material is attached to the other member to be joined. When the hook member is facing the loop member and the two members are pressed together, the two members form a releasably attachment. Hook and loop type fasteners are desirable because they form a substantially weathertight connection between the joined two members. The abundance of interlocking hooks and loops substantially prevents water, dirt and other debris from penetrating the fastening. Moreover, the hook and loop member that is attached to sheet material top side 46 has a thickness, and that thickness acts as a lip to prevent water or moisture pools on sheet material top side 46 from flowing to fastener 58 or opening 50.

Figure 3:
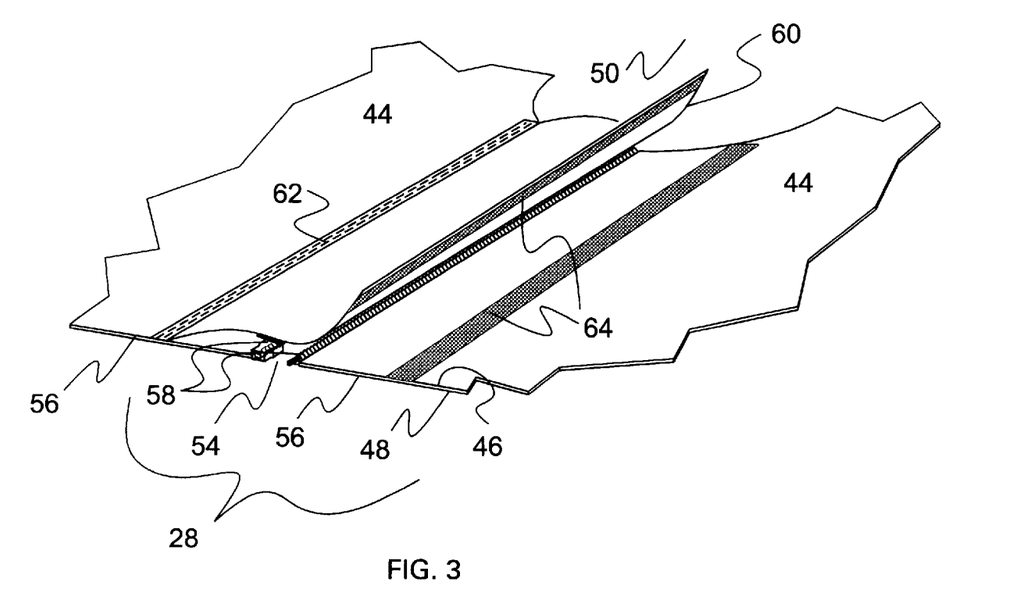
FIG. 3 shows an exploded perspective view of a preferred embodiment of a tonneau cover zipper fastener covered by a flap.

FIG. 3 shows an exploded perspective view of a preferred embodiment of tonneau cover 28 in the vicinity of cut 54. Fasteners 58 and 64 and flap 60 are shown in an open configuration. In this embodiment, releasable fastener 58 is a zipper that is sewn or unreleasably attached to sheet material 44 at cut 54 to releasably join the two sheet material sections created by cut 54. Those skilled in the art of fasteners recognize that a zipper having interlocking teeth tends not to form a weathertight seal. Gaps between zipper teeth exist when the zipper is closed. These gaps allow water, dirt and other debris to penetrate the zipper fastening. In this embodiment zipper 58 is used for its connecting strength. It is flap 60 that provides the desired weathertight seal by fully covering zipper 58. Rectangular flap 60 is unreleasably attached or sewn to sheet material top side 46 on one side of zipper 58 and is releasably attached on the other side of zipper 58 by hook and loop fastener 64. Hook and loop fastener 64 is positioned between sheet material top side 46 and flap 60. When closed, flap 60 fully covers zipper 58 and lays substantially flush with sheet material top side 46.

FIG. 4 shows a perspective view of a preferred embodiment of a tonneau cover 28 and an installation assembly 76 relative to pickup truck bed 20. Installation assembly 76 includes support members 78 and 80. Tonneau cover 28 is shown raised above truck bed 20 to expose installation assembly 76, hitch receiver 52, and support members 78 and 80. Support member 78 extends from truck bed left side 32 to truck bed right side 34 and is located proximate a side of opening 50 that is closest to truck bed back end 38. Support member 78 has two ends and is attached to the top of truck bed 20 at each end by fasteners 82. Support member 80 extends from truck bed back end 38 to support member 78 and is located proximate zipper 58 of tonneau cover 28. Support member 80 has two ends and is attached at one end to the top of tailgate 42 by a fastener 84 and is attached at the opposite end to support member 78 by a fastener 86.

Support members 78 and 80 are strategically located underneath tonneau cover 28 to give added support and to prevent sagging of the sheet material in areas where cuts have been made. Cutting sheet material 44 provides openings through which water or other debris might possibly pass and reduces its structural integrity somewhat. Support member 80 is located under zipper 58 and support member 78 is located close to a side of opening 50 to prevent the collection of water and other debris in the vicinity of cut 54 and opening 50. Moreover, support members 78 and 80 are bowed and of a thickness that causes a small rise in sheet material 44 of approximately three-fourths of an inch above level in the central region of truck bed 22. The raised sheet material trains water or moisture pools away from opening 50 and zipper 58. Additional support members at other locations could be added as required.

In one embodiment, fasteners 82, 84 and 86 are hook and loop type fasteners. In another embodiment fastener 86 is a hook or other rigid arcuate-shaped member that hooks over the top of support member 78. It is desirable to remove the support members during trailer hook-up so that support members 78 and 80 do not interfere with trailer tongue 26 (FIG. 1). Accordingly, the fasteners attaching the support members in the preferred embodiments are of the releasable type.

A Trailer hook-up procedure for the embodiment shown in FIG. 4 is quick, simple and easy. Sheet material 44 is separated at zipper 58. Sheet material 44 is then pulled toward truck bed front end 36 to expose support members 78 and 80. Being releasably attached by fasteners 82, 84 and 86, support members 78 and 80 are easily removed and set aside until trailer hook-up is complete. After lowering tailgate 42 if necessary, fifth wheel trailer tongue 26 (FIG. 1) is attached to hitch receiver 52. Trailer hook-up being complete, support members 78 and 80 are then reattached by fasteners 82, 84, and 86. Sheet material 44 is pulled over support members 78 and 80 toward truck bed back end 38, where zipper 58 is reconnected and zipped closed. Next, tonneau cover sheet material 44 is releasably attached to truck bed 22 in a manner discussed below.

Figure 5:
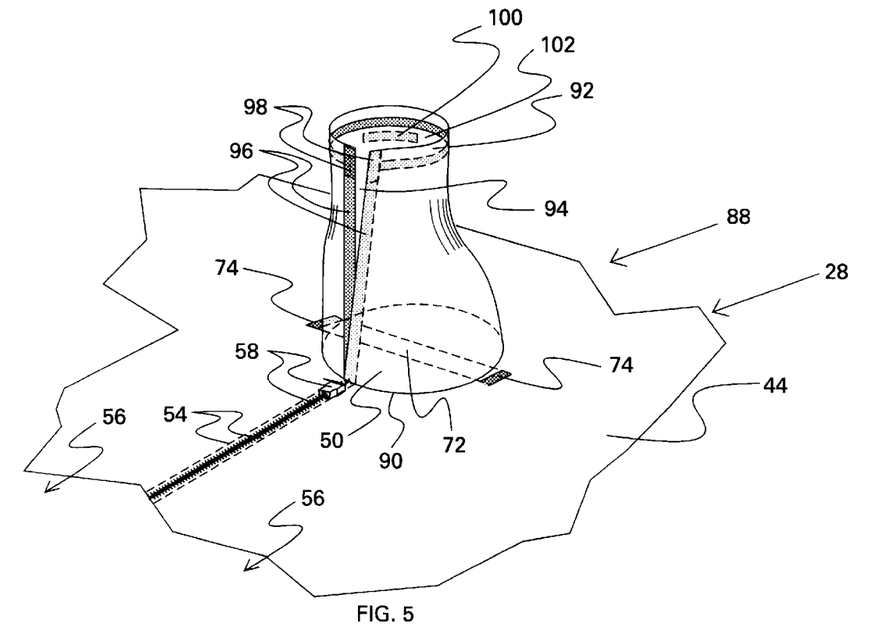
FIG. 5 shows an exploded perspective view of a preferred embodiment of a sleeve assembly attached to a fifth wheel adaptable tonneau cover.

FIG. 5 shows a perspective view of a preferred embodiment of a sleeve assembly 88 attached to tonneau cover 28. Sleeve assembly 88 includes a sleeve of material that has a sleeve bottom side 90 and a sleeve top side 92. A cut 94 extends from sleeve bottom side 90 to sleeve top side 92 of sleeve assembly 88. Sleeve bottom side 90 of sleeve assembly 88 is attached to sheet material 44 at a perimeter of opening 50 so that cut 94 lines up with zipper 58. Cut 94 in sleeve assembly 88 is joined by a fastener 96 that is attached to sleeve assembly 88 at cut 94. Proximate sleeve top side 92 of sleeve assembly 88 is a fastener 98 which is attached at an outer surface of sleeve assembly 88, extends around a perimeter of sleeve assembly 88, and fastens at cut 94. A fastener 100, located opposite cut 94 and below fastener 98, is attached to an outer surface of sleeve top side 92. When sleeve assembly 88 is extended, as shown in FIG. 5, sleeve top side 92 of sleeve assembly 88 forms a sleeve opening 102. Strap 72 extends across opening 50 and is attached to sheet material bottom side 48 (FIGS. 2 and 4) by fastener 74.

Figure 7:
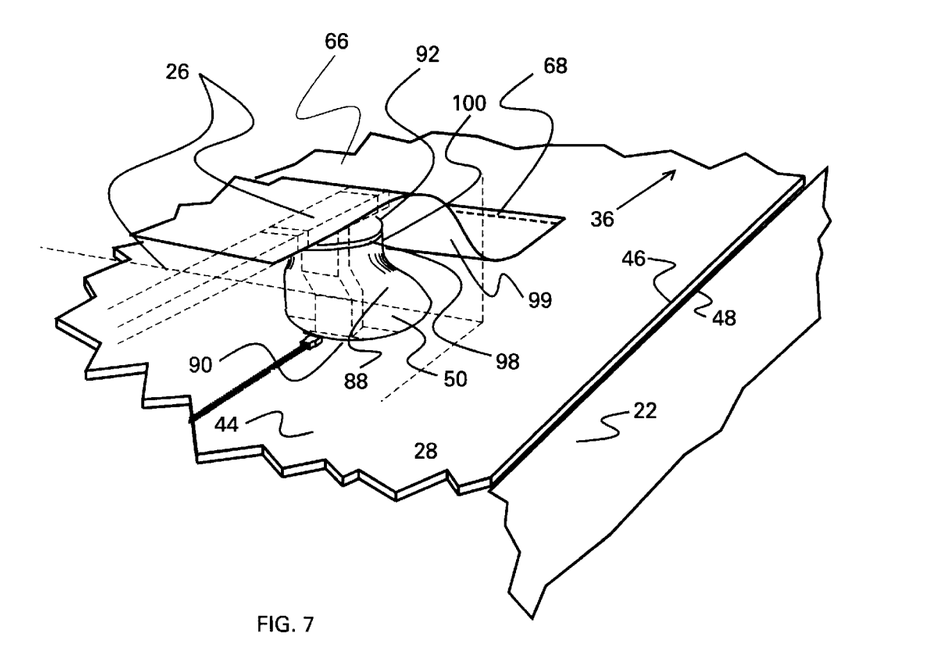
FIG. 7 shows an exploded perspective view of a preferred embodiment of a fifth wheel adaptable tonneau cover and sleeve assembly installed on a pickup truck bed.

Trailer hook-up procedure for the embodiment shown in FIG. 5 is similar to that discussed for the embodiment shown in FIG. 4. Sheet material 44 and sleeve assembly 88 are separated at zipper 58 and fasteners 96, 98 and 74. Sheet material 44, sleeve assembly 88, and strap 72 are detached and moved so that trailer tongue 26 (see FIG. 1) can be attached to hitch receiver 52, after lowering tailgate 42 (FIGS. 2 and 4) if necessary. Trailer hook-up being complete, tailgate 42 is raised and sheet material 44 is repositioned over truck bed 22 (see FIG. 4) and zipper 58 is closed. Sleeve assembly 88 is then extended to cover or otherwise surround fifth wheel trailer tongue 26, as shown in FIG. 7. Cut 94 is joined by fastener 96. Fastener 98 is tightened so that it constricts sleeve opening 102 about trailer tongue 26. When installed and so configured, sleeve assembly 88 act as a weathertight covering, preventing water and wind blown debris from getting into truck bed 22, trailer tongue 26, and trailer hitch 52. Again the procedure for trailer hook-up, with tonneau cover 28 installed, is quick simple and easy to perform.

Figure 6:
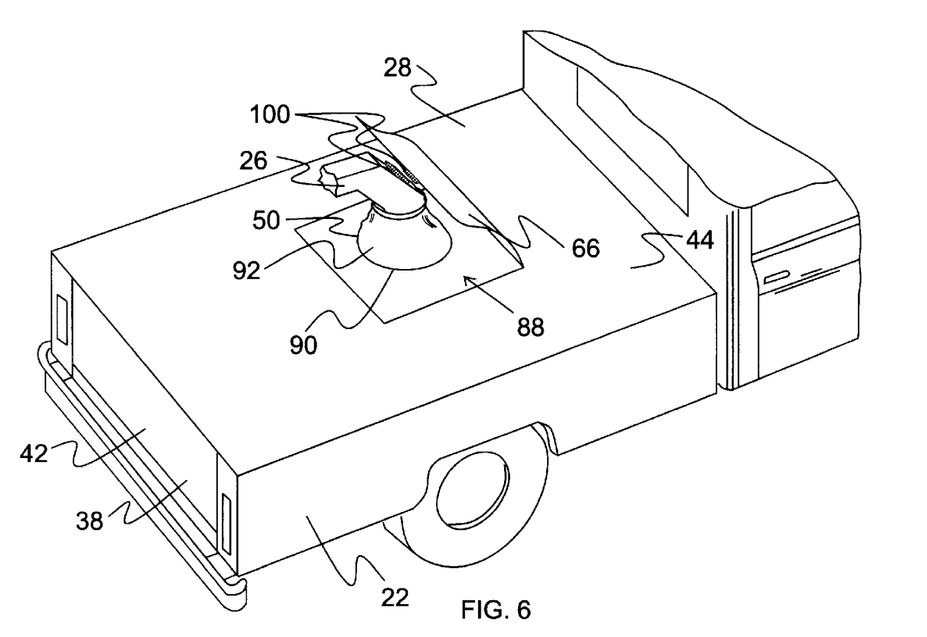
FIG. 6 shows a perspective view of a preferred embodiment of a fifth wheel adaptable tonneau cover and sleeve assembly installed on a pickup truck bed.

FIG. 6 shows a perspective view of a preferred embodiment of tonneau cover 28 and sleeve assembly 88 on truck bed 22. For clarity, sleeve assembly 88 is shown extended and sleeve top side 92 is shown to loosely fit about trailer tongue 26. Fifth wheel trailer tongue 26 is attached to fifth wheel trailer 24 (FIG. 1) and extends through opening 50 to couple with hitch receiver 52 (FIG. 4). Flap 66 is attached to sleeve assembly 88 at fastener 100 so that flap 66 acts as a wind deflector when trailer 24 is in tow (FIG. 1). It should be noted that the length or distance from sleeve bottom side 90 to sleeve top side 92 is such that when sleeve top side 92 is fastened tight about trailer tongue 26, sleeve assembly 88 will not interfere with or be damaged by truck and trailer operation. That is, when pickup truck 20 has fifth wheel trailer 24 in-tow sleeve assembly 88 and tonneau cover 28 do not interfere with and are not damaged by execution of a 90 degree right or left turn going forward or going in reverse. Interference is prevented by making sleeve assembly 88 have sufficient length so that sleeve top side 92 may extensively twist relative to sleeve bottom side 90. In the preferred embodiments, this length is around 27 inches.

FIG. 7 shows an exploded perspective view of fifth wheel adaptable tonneau cover 28 and sleeve assembly 88 installed on pickup truck bed 22. Sleeve assembly 88 is shown extended with sleeve top side 92 being constricted by fastener 98. For clarity, sleeve top side 92 is shown to loosely fit around fifth wheel trailer tongue 26. A section of sleeve assembly 88 is attached to a bottom side 99 of flap 66 by fastener 100. Fastener 100 is positioned such that when sleeve assembly 88 is extended, flap 66 extends above top side 46. In the wind stream when pickup truck 20 and trailer 24 are moving forward, flap 66 molds itself around tongue 26 and acts as a wind deflector.

In an alternate embodiment, sleeve assembly 88 is sewn to bottom side 99 of flap 66, and flap 66 is sewn to sheet material 44. In other words, releasable fastener 100 is replaced with an unreleasable attachment. For this embodiment, when fifth wheel trailer tongue 26 is not attached, sleeve assembly 88 compressibly fits into opening 50. Flap 66 lays on top of sheet material 44 and prevents sleeve assembly 88 from falling on top of hitch receiver 52.

Figure 8:
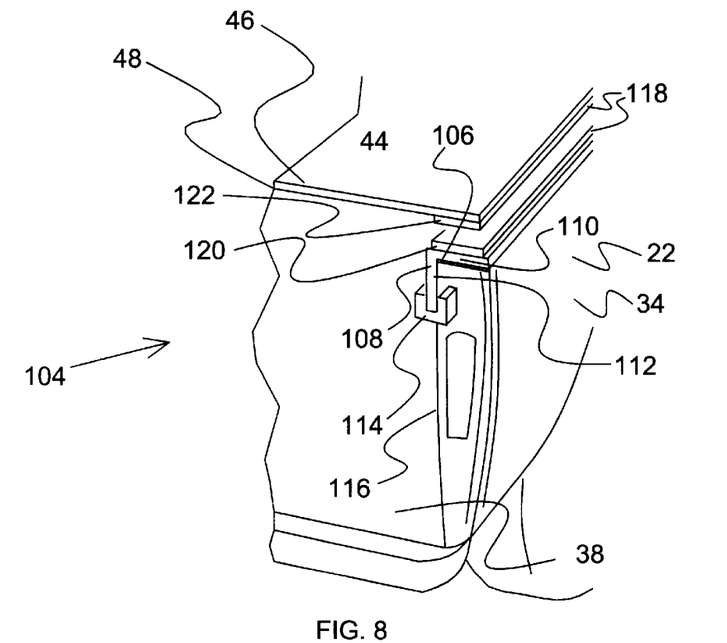
FIG. 8 shows an exploded perspective view of a preferred embodiment of a tonneau cover fastener assembly.

FIG. 8 shows a perspective view of a preferred embodiment of a tonneau cover fastener assembly 104 for attaching tonneau cover 28 to truck bed 22. Tonneau cover fastener assembly 104 includes members and fasteners that attach sheet material 44 to truck bed 22. A foam cushion material 106 is desirably located on top of truck bed right side 34. A rail 108 having an "L" shape, is positioned so that a first rail side 110 lays on top of foam cushion material 106 and truck bed right side 34. A second rail side 112 is positioned inside truck bed 22 and extends downward from first rail side 110. Rail 108 is fastened to truck bed 22 by a clamp 114 that attaches to second rail side 112 and a truck bed interior wall 116. A hook and loop fastener 118 is positioned between first rail side 110 and sheet material 44 so that a perimeter of sheet material 44 can be attached to first rail side 108. Hook and loop fastener 118 includes a hook member 120 that is attached to a top side of first rail side 110 and a loop member 122 that is attached to an underside of sheet material 44, but the relative positioning of members 120 and 122 may be reversed. Hook member 120 desirably has a width of first rail side 110 and extends the length of first rail side rail 110, which is approximately as long as truck bed 22. Loop member 122 is of equal length and width as hook member 120 and is attached to the perimeter of sheet material 44 so that perimeter of the sheet material 44 can be fastened to perimeter of the truck bed 22

For clarity, FIG. 8 shows tonneau cover fastener assembly 104 attaching to truck bed right side 34, a similar rail and fastener configuration exists for truck bed left side 32 (not shown). A "U" shaped channel (not shown) extending from interior of truck bed left side 32 to interior of truck bed right side 34 is positioned upside-down over truck bed front end 36. Hook and loop fastener 118 is positioned between this "U" shaped channel and sheet material 44 so that the front perimeter of sheet material 44 can be attached to top of "U" channel.

In an alternate embodiment, the rails and channels discussed above, including rail 94, are eliminated and hook and loop members directly attach to the top of truck bed 22. For this embodiment, removal of tonneau cover 28 would leave one of the hook and loop members attached to top of truck bed 22. In both embodiments discussed above, hook and loop fastener 118 is positioned so that sheet material 44 is stretched taunt over the truck bed 22 to prevent water pooling and hook member 120 and loop member 122 are joined firmly together, forming a substantially weathertight seal. Moreover, fasteners 82 and 84 of members 78 and 80 (FIG. 4) may attach to hook and loop fastener 118 whether or not rails are used.

Figure 9:
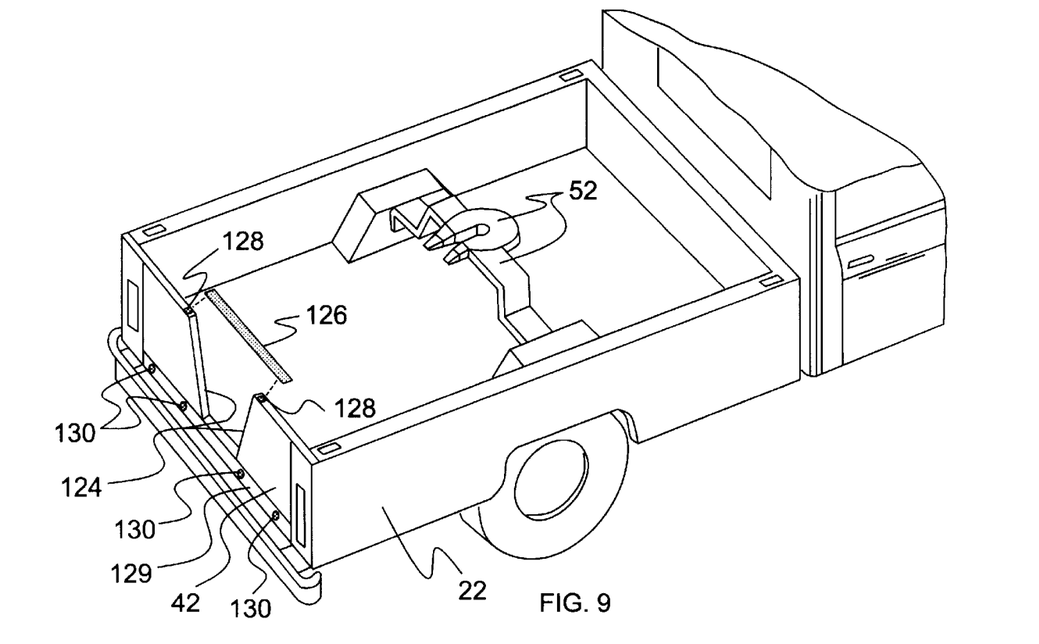
FIG. 9 shows a perspective view of a preferred embodiment of a pickup truck bed having a "v" notch type tailgate.

FIG. 9 shows a perspective view of pickup truck bed 22 having a "V" notch 124 located in tailgate 42. Tailgate 42 is in an upright or closed position and "V" notch 124 is positioned and dimensioned to allow attachment of fifth wheel trailer tongue 26 to hitch receiver 52 without lowering tailgate 42. To support sheet material rear edge 56 (FIG. 2), a support member 126 extends across the top of "V" notch 124 and is attached to the top of tailgate 42 by fastener 128. Tailgate 42 has a lower rail 129 with fasteners 130 attached thereto. In this embodiment, straps (not shown) unreleasably attach to sheet material 44 at rear edge 56 thereof. A loose end of these straps have a mating fastener (not shown) for fasteners 130. These mating fasteners are attached to tailgate 42 at fasteners 130.

For the embodiment shown in FIG. 9, fasteners 128 and 130 are desirably hook and loop fasteners to allow quick and easy attachment and removal of tonneau cover 28 (not shown) and support member 126. However, these fasteners could be any of a variety and combination of fasteners that make releasable or unreleasable attachments.

In summary, the present invention provides an improved fifth wheel adaptable tonneau cover for a pickup truck equipped with a fifth wheel trailer hitch. Since the tonneau cover is made from a flexible sheet material, it is a lightweight truck bed cover that accommodates a fifth wheel trailer hitch and yet is foldable and storable in a small space and as one piece. Due to various above-described fasteners and cuts, the present invention is easily installed and removed for a variety of truck bed tail gates while accommodating hitching and removal of a fifth wheel trailer and providing easy access to all portions of the truck bed when the tonneau cover is installed. Weathertight protection for the truck bed and trailer hitch is provided by the inclusion of a specifically configured flap and sleeve.

Those skilled in the art will readily recognize that the above-discussed preferred embodiments shown in FIG. 1 through FIG. 9 are exemplary embodiments that can be combined to yield other embodiments. Although the preferred embodiments of the invention have been illustrated and described in detail, it will be readily apparent to those skilled in the art that various modifications may be made therein without departing from the spirit of the invention or from the scope of the appended claims.

What is claimed is:

1. A fifth wheel adaptable tonneau cover for attaching to a pickup truck bed having a fifth wheel trailer hitch mounted therein, said tonneau cover comprising:

a flexible sheet material dimensioned to cover said truck bed, said sheet material having an opening positioned over said trailer hitch;

a flap formed from a flexible material having a bottom side that faces said truck bed, said flap being attached to said sheet material and configured to cover said opening; and a sleeve attached to said bottom side of said flap, said sleeve having a top side and a bottom side, where said bottom side of said sleeve is attached to said sheet material at said opening and said top side of said sleeve forms a sleeve opening, said sleeve having a fastener, said fastener constricting said sleeve opening.

2. A tonneau cover as claimed in claim 1 wherein:

said tonneau cover includes a fastener which attaches said sheet material to said truck bed.

3. A tonneau cover as claimed in claim 2 wherein said fastener comprises:

a first hook and loop member attached to said sheet material at a perimeter of said sheet material;

a rail having first and second sides positioned at an angle to one another; a second hook and loop member attached to said first side of said rail, said second hook and loop member being configured to mate with said first hook and loop member; and a clamp for removably attaching said second side of said rail to said pickup truck bed.

4. A tonneau cover as claimed in claim 1 wherein:

said sleeve has a cut that extends from said sleeve bottom side to said sleeve top side; and said tonneau cover additionally comprises a fastener attached to said sleeve proximate to said cut to join together said sleeve at said cut and being so joined, said top side of said sleeve forms said sleeve opening.

5. A fifth wheel adaptable tonneau cover for attaching to a pickup truck bed having a fifth wheel trailer hitch mounted therein, said tonneau cover comprising:

a flexible sheet material dimensioned to cover said truck bed, said sheet material having an opening positioned over said trailer hitch and having a cut that extends from said opening to an edge of said sheet material;

a flap that covers said opening and is attached to said sheet material;

a fastener attached to said sheet material proximate said cut to removably join together said sheet material at said cut;

a flexible sleeve with a top side and a bottom side, where said bottom side is attached to said sheet material at said opening and said top side of said sleeve forms a sleeve opening having a fastener for selectively constricting said sleeve opening; and a fastener proximate to said sleeve top side for attaching to said flap so that said flap acts as a wind deflector when said sleeve is in use.

6. A fifth wheel adaptable tonneau cover for attaching to a pickup truck bed having a rear end and a fifth wheel trailer hitch mounted therein, said tonneau cover comprising:

a flexible sheet material dimensioned to cover said truck bed, said sheet material having an opening positioned over said trailer hitch and having a rear edge which resides proximate said truck bed rear end;

a flexible flap that selectively covers said opening and is attached to said sheet material, said flap having a bottom side which faces said truck bed;

a sleeve having a bottom side and top side where said bottom side is attached to said sheet material at said opening, said sleeve being attached to said bottom side of said flap;

a cut formed in said sheet material and said sleeve, said cut extending from said sheet material rear edge to said top side of said sleeve;

a first fastener attached to said sheet material proximate said cut to removably join together said sheet material at said cut; and a second fastener attached to said sleeve proximate said cut to removably join together said sleeve at said cut.

7. A tonneau cover as claimed in claim 6 wherein:

said first fastener is a zipper; and said second fastener is a hook and loop fastener.

8. A tonneau cover as claimed in claim 7 additionally comprising:

a fastener attached to said top side of sleeve to constrict said sleeve; and a plurality of support members configured to be positioned on top of said truck bed and underneath said sheet material such that a first one of said support members extends across a width dimension of said truck bed and couples to a second one of said support members that extends from said first support member to said rear end of said truck bed proximate to said cut in said sheet material.

* * * * *